(12) United States Patent
Schuman et al.

(10) Patent No.: US 8,686,896 B2
(45) Date of Patent: Apr. 1, 2014

(54) BENCH-TOP MEASUREMENT METHOD, APPARATUS AND SYSTEM FOR PHASED ARRAY RADAR APPARATUS CALIBRATION

(75) Inventors: Harvey K. Schuman, Cazenovia, NY (US); Anthony M. Davis, Milwaukee, WI (US); Donald M. McPherson, Pompey, NY (US); Michael Robinson, Drexel Hill, PA (US); David R. Hagenmayer, Liverpool, NY (US); John G. Wiley, Marietta, NY (US)

(73) Assignee: SRC, Inc., North Syracuse, NY (US)

( * ) Notice: Subject to any disclaimer, the term of this patent is extended or adjusted under 35 U.S.C. 154(b) by 238 days.

(21) Appl. No.: 13/025,652

(22) Filed: Feb. 11, 2011

(65) Prior Publication Data

US 2012/0206291 A1      Aug. 16, 2012

(51) Int. Cl.
*G01S 7/40* (2006.01)
*H01Q 3/26* (2006.01)
*G01S 7/00* (2006.01)
*H01Q 3/00* (2006.01)

(52) U.S. Cl.
USPC ........... 342/173; 342/165; 342/174; 342/350; 342/368; 342/377

(58) Field of Classification Search
USPC ................ 342/165–175, 195, 360, 368–377, 342/73–82, 89, 350; 343/700 R, 703; 702/85, 106, 127, 182–185
See application file for complete search history.

(56) References Cited

U.S. PATENT DOCUMENTS

| | | | |
|---|---|---|---|
| 3,378,846 A * | 4/1968 | Lowenschuss | 342/360 |
| 3,604,000 A * | 9/1971 | Briana et al. | 342/173 |
| 4,060,806 A * | 11/1977 | Davies et al. | 342/174 |
| 4,176,354 A * | 11/1979 | Hsiao et al. | 342/173 |
| 4,700,192 A * | 10/1987 | Zezuto et al. | 342/173 |
| 4,811,023 A * | 3/1989 | Gelernter et al. | 343/703 |

(Continued)

FOREIGN PATENT DOCUMENTS

| | | |
|---|---|---|
| CN | 101588198 | 11/2009 |
| FR | 2750209 | 12/1997 |
| GB | 2467773 | 8/2010 |

OTHER PUBLICATIONS

Alexander, "Using the calculable dipole antenna for antenna calibration and validation of EMC test sites", 2010 Asia-Pacific International Symposium on Electromagnetic Compatibility (APEMC) [Online] 2010 pp. 782-785.

(Continued)

*Primary Examiner* — Bernarr Gregory
(74) *Attorney, Agent, or Firm* — George R. McGuire; Blaine T. Bettinger; Bond Schoeneck & King, PLLC

(57) ABSTRACT

A method for determining beamformer scattering parameters for a plurality of phased array radar antenna subarrays that each include a radiating (e.g., dipole) component and a beamformer component provides for obtaining for the plurality of phased array radar antenna subarrays a plurality of electromagnetic measurements at a plurality of ports. Analogous electromagnetic measurements are obtained for a reference subarray including a radiating component but absent a beamformer component. The plurality of phased array radar antenna subarray electromagnetic measurements and the reference subarray electromagnetic measurements provide a plurality of beamformer scattering parameter values for the plurality of phased array radar antenna subarrays that may be used in modeling and calibrating a phased array radar apparatus that may be assembled from the plurality of phased array radar antenna subarrays.

20 Claims, 8 Drawing Sheets

(56) References Cited

U.S. PATENT DOCUMENTS

| | | | |
|---|---|---|---|
| 4,926,186 A * | 5/1990 | Kelly et al. ............... 342/360 |
| 4,949,090 A * | 8/1990 | Tamii et al. ............... 342/173 |
| 4,970,521 A * | 11/1990 | Lee ............................ 342/360 |
| 5,063,529 A * | 11/1991 | Chapoton ................... 702/106 |
| 5,187,486 A * | 2/1993 | Kolzer ...................... 342/360 |
| 5,248,982 A * | 9/1993 | Reinhardt et al. ......... 342/375 |
| 5,294,934 A * | 3/1994 | Matsumoto ................ 342/173 |
| 5,337,059 A * | 8/1994 | Kolzer et al. .............. 342/360 |
| 5,412,414 A * | 5/1995 | Ast et al. ................... 342/174 |
| 5,432,523 A * | 7/1995 | Simmers et al. ............ 343/703 |
| 5,477,229 A | 12/1995 | Caille et al. |
| 5,530,449 A * | 6/1996 | Wachs et al. ............... 342/174 |
| 5,559,519 A * | 9/1996 | Fenner ....................... 342/174 |
| 5,572,219 A * | 11/1996 | Silverstein et al. .......... 342/375 |
| 5,644,316 A * | 7/1997 | Lewis et al. ................. 342/174 |
| 5,677,696 A * | 10/1997 | Silverstein et al. ......... 342/360 |
| 5,809,063 A * | 9/1998 | Ashe et al. ................. 342/174 |
| 5,809,087 A * | 9/1998 | Ashe et al. ................. 342/174 |
| 5,861,843 A * | 1/1999 | Sorace et al. .............. 342/372 |
| 5,864,317 A | 1/1999 | Boe et al. |
| 5,867,123 A * | 2/1999 | Geyh et al. ................. 342/372 |
| 5,929,809 A * | 7/1999 | Erlick et al. ................ 342/372 |
| 6,084,545 A * | 7/2000 | Lier et al. ................... 342/360 |
| 6,163,296 A * | 12/2000 | Lier et al. ................... 342/174 |
| 6,208,287 B1* | 3/2001 | Sikina et al. ............... 342/174 |
| 6,236,839 B1 | 5/2001 | Gu et al. |
| 6,252,542 B1* | 6/2001 | Sikina et al. ............... 342/174 |
| 6,384,781 B1* | 5/2002 | Kautz et al. ................ 342/368 |
| 6,492,942 B1 | 12/2002 | Kezys |
| 6,636,173 B2* | 10/2003 | Graham ..................... 342/174 |
| 6,686,873 B2* | 2/2004 | Patel et al. ................. 342/174 |
| 6,720,919 B1* | 4/2004 | Sinsky et al. .............. 342/368 |
| 6,744,405 B2* | 6/2004 | Wahl ......................... 342/377 |
| 6,771,216 B2* | 8/2004 | Patel et al. ................. 342/368 |
| 6,806,837 B1 | 10/2004 | Saucier et al. |
| 6,833,812 B2 | 12/2004 | Diament |
| 6,844,849 B1 | 1/2005 | Barrick et al. |
| 6,861,975 B1* | 3/2005 | Coleman, Jr. et al. ...... 342/174 |
| 6,891,497 B2* | 5/2005 | Coleman et al. ........... 342/174 |
| 7,119,739 B1 | 10/2006 | Struckman |
| 7,199,753 B2* | 4/2007 | Pauplis ..................... 342/368 |
| 7,215,298 B1 | 5/2007 | Fraschilla et al. |
| 7,443,359 B2 | 10/2008 | Brune et al. |
| 7,446,698 B2* | 11/2008 | Bast ........................... 342/174 |
| 7,446,728 B2 | 11/2008 | Li |
| 7,482,976 B2 | 1/2009 | Plesinger |
| 7,671,799 B1 | 3/2010 | Paek et al. |
| 7,683,842 B1 | 3/2010 | Engel et al. |
| 7,714,775 B2* | 5/2010 | Navarro et al. ............ 342/174 |
| 7,714,776 B2 | 5/2010 | Cooper et al. |
| 7,714,782 B2 | 5/2010 | Davis et al. |
| 7,768,453 B2* | 8/2010 | Mason et al. ............... 342/368 |
| 7,786,933 B2 | 8/2010 | Chang |
| 7,990,312 B2* | 8/2011 | Scott ........................... 342/165 |
| 8,004,456 B2* | 8/2011 | Scott ........................... 342/174 |
| 8,004,457 B2* | 8/2011 | Scott ........................... 342/174 |
| 8,013,783 B2* | 9/2011 | Lomes et al. ............... 342/165 |
| 8,085,189 B2* | 12/2011 | Scott ........................... 342/174 |
| 8,154,452 B2* | 4/2012 | Webb .......................... 342/368 |
| 8,184,042 B2* | 5/2012 | Ray et al. .................... 342/174 |
| 8,199,048 B1* | 6/2012 | Medina Sanchez ......... 342/174 |
| 8,212,716 B2* | 7/2012 | Goshen et al. .............. 342/169 |
| 8,299,964 B2* | 10/2012 | Janaswamy et al. ......... 342/372 |
| 2005/0159187 A1 | 7/2005 | Mendolia et al. |
| 2006/0055592 A1 | 3/2006 | Leather et al. |
| 2008/0129613 A1 | 6/2008 | Ermutlu et al. |
| 2009/0309786 A1 | 12/2009 | Stolpman et al. |
| 2010/0121318 A1 | 5/2010 | Hancock et al. |

OTHER PUBLICATIONS

Betta et al. "Calibration of Antenna for EMI Measurements in Compact Semi-anechoic Rooms.", 16th IMEKO TC4 Symposium [Online] 2008.

Dandekar et al., "Smart Antenna Array Calibration Procedure Including Amplitude and Phase Mismatch and Mutual Coupling Effects." 2000 IEEE International Conference on Personal Wireless Communications [Online] 2000.

Garn et al., "Primary Standards for Antenna Factor Calibration in the Frequency Range of (30 to 1000) MHz." IEEE Transactions on Instrumentation and Measurement [Online] Apr. 1997, vol. 46, Issue 2, pp. 544-548.

Hazdra et al., "Microwave Antennas and Circuits Modeling Using Electromagnetic Field Simulator." Radioengineering [Online] 2005, vol. 14, No. 4, pp. 2-10.

Kim et al., "Precise Phase Calibration of a Controlled Reception Pattern GPS Antenna for JPALS." Position Location and Navigation Symposium [Online] 2004.

"Planar Antenna Simulation in AXIEM." http://web.awrcorp.com/content/Downloads/MWJ-AXIEM-July-2010.pdf (accessed Sep. 7, 2010).

Takamizawa, "Analysis of Highly Coupled Wideband Antenna Arrays Using Scattering Parameter Network Models." Dissertation for Doctor of Philosophy in Electrical Engineering in Virginia Polytechnic Institute and State University [Online] 2002.

Yamada et al., "Mutual Impedance of Receiving Array and Calibration Matrix for High-resolution DOA Estimation." IEEE/ACES International Conference on Wireless Communications and Applied Computational Electromagnetic [Online] 2005.

* cited by examiner

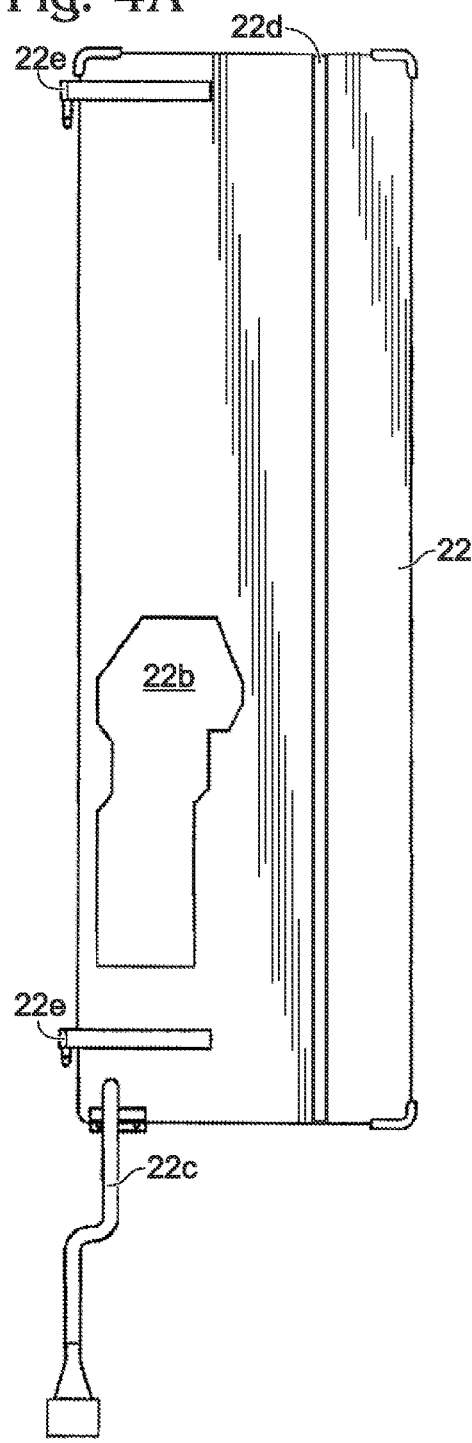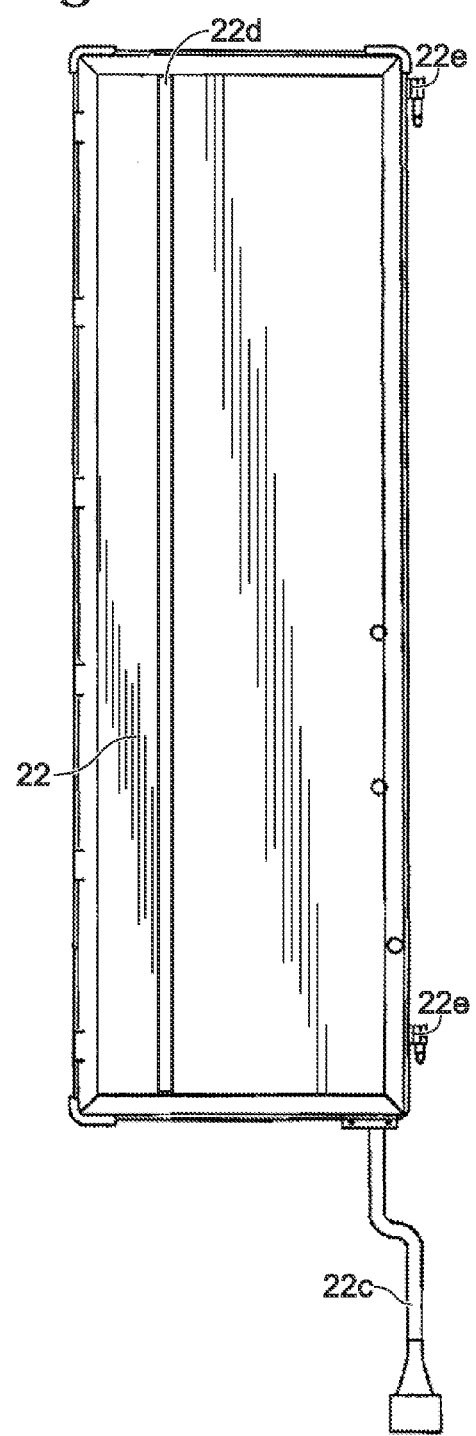

BENCH-TOP   COLUMN ARRAY
TEST BOX    UNDER TEST

REFERENCE
ARRAY

BEAM-
FORMER

IN SITU COLUMN ARRAY;
TERM. DIPOLES,
NO BEAMFORMER

BENCH-TOP MEASUREMENT METHOD, APPARATUS AND SYSTEM FOR PHASED ARRAY RADAR APPARATUS CALIBRATION

STATEMENT OF GOVERNMENT INTEREST

This work derives from research under Government Contract W15P7T-05-C-P004. The U.S. Government has rights in this invention.

BACKGROUND OF THE INVENTION

1. Field of the Invention

The invention relates generally to radar apparatus. More particularly, the invention relates to efficient calibration of radar apparatus that may provide for, but is not necessarily limited to, accurate angle-of-arrival calibration of a phased array radar apparatus.

2. Description of the Related Art

Radar apparatus are commonly used in commercial and military settings for purposes of identifying and tracking a particular radar target within a particular geometric radar field of interest. In order to provide for accurate identification and tracking of such a radar target, radar apparatus typically require calibration. For example, accurate angle-of-arrival measurement within a radar apparatus often requires calibration of a radar antenna within the radar apparatus.

Such calibration of a radar antenna is often accomplished by measurement of radar antenna performance in a radar antenna test range, such as but not limited to an anechoic chamber or a near field test range, and subsequent construction of a look-up table that relates radar antenna output signal voltages to incoming radar signals angle-of-arrival. In addition to such initial radar antenna calibration, recalibration of a radar antenna or radar apparatus is also typically desirable under circumstances of radar antenna or radar apparatus malfunction or repair.

Calibration of radar apparatus may be effected subsequent to installation of the radar apparatus. Such post installation calibration of radar apparatus is often essential for assuring accuracy of such installed radar apparatus.

While post installation calibration of radar apparatus is thus a common and operative procedure for radar apparatus calibration, nonetheless in certain military settings, such as hostile environment settings, field calibration of radar apparatus may present some difficulties or may not otherwise be practical.

Thus, desirable within radar apparatus are methods that provide for radar apparatus calibration in other than field environments so as to assure efficient operation of the radar apparatus in field environments. Calibration methods are also desired, as well, that avoid the need for labor and time intensive measurements in a radar antenna test range, such as an anechoic chamber or a near-field test range.

SUMMARY OF THE INVENTION

Embodiments of the invention include: (1) a method for determining values of performance parameters for a plurality of operational phased array radar antenna subarrays; and (2) a method for calibrating a phased array radar apparatus that may use the plurality of operational phased array radar antenna subarrays, values of whose performance parameters are determined in accordance with the embodiments. Embodiments also include a particular test apparatus and a particular test system that may be used within the context of the foregoing methods.

Within the context of the embodiments and the claimed invention, a "phased array radar apparatus" is intended to include a phased array radar antenna that is constructed of, and comprises, detachable subarrays. Each detachable subarray comprises: (1) a combining network component; and (2) an array of radiating elements component (i.e., where the radiating elements are typically dipoles to thus provide a "dipole component"). Thus, within the embodiments and the claimed invention a phased array radar antenna is intended to include: (1) a multibeam phased array radar antenna with fixed phase shifters; as well as (2) a more typical phased array radar antenna with adjustable phase shifters.

In accordance with the foregoing discussion, phased array radar antennas in accordance with the embodiments and the invention comprise subarrays that include a radiating element component, such as an array of dipoles (i.e., a dipole component), in conjunction with a combining network component. For design economy, cost economy or other reasons, the foregoing two components may be integrated into a continuous and contiguous structure without benefit of detachable connectors. It is anticipated that such integration may present difficulties since determination of values of performance parameters of a combining network component may not necessarily be readily measured directly absent physical separation of the combining network component from the radiating element component (i.e., the dipole component). Often, values of performance parameters of the combining network component must desirably be independently measured to sufficiently satisfy calibration requirements since the combining network often comprises signal distribution components, (i.e., power dividers and/or couplers, amplifiers, filters and other such complex components) that, for calibration purposes, are not generally amenable to independent modeling and analysis. It is anticipated that the radiating element component (e.g., the dipole component) and an immediate scattering structure that surrounds the radiating element component, on the other hand, are structurally less complex and readily amenable to characterization using modern computational electromagnetic (CEM) analysis computer code.

Generally, the particular methods in accordance with the embodiments provide for determination of values of performance parameters for a plurality of operational phased array radar antenna subarrays, each of which includes a radiating elements component (e.g., the dipole component), and a beamformer component, by independent electromagnetic measurements of the plurality of operational phased array radar antenna subarrays in the test apparatus. The resulting electromagnetic measurements may then be compared with reference electromagnetic measurements of a reference phased array radar antenna subarray (i.e., a reference subarray) which includes the dipole component but does not include the beamformer component. As a result of calculations involving these independent: (1) electromagnetic measurements of the operational phased array radar antenna subarrays which include the dipole component and the beamformer component; and (2) reference electromagnetic measurements of the reference subarray that includes the dipole component but does not include the beamformer component, values for beamformer parameters, and in particular values for beamformer scattering parameters, for individual operational phased array radar antenna subarrays within the plurality of operational phased array radar antenna subarrays may be determined.

The resulting experimentally determined values for beamformer parameters (i.e., scattering parameters) for each of the operational phased array radar antenna subarrays within the plurality of operational phased array radar antenna subarrays may then be introduced into and integrated with the computational electromagnetic analysis computer code geometric model of the phased array radar apparatus that comprises the plurality of operational phased array radar antenna subarrays to provide in-situ phased array radar apparatus performance characteristics which may serve as a basis for calibration of the phased array radar apparatus.

A particular method for determining scattering parameters for a phased array radar antenna subarray in accordance with the embodiments includes measuring for a reference subarray that includes a dipole component but not a beamformer component values for a plurality of reference electromagnetic parameters. This particular method also includes measuring for an operational phased array radar antenna subarray that includes the dipole component and the beamformer component values for a plurality of operational electromagnetic parameters. This particular method also includes calculating from the values of the plurality of operational electromagnetic parameters and the values of the reference electromagnetic parameters values for beamformer scattering parameters for the operational phased array radar antenna subarray.

A particular method for calibrating a phased array radar apparatus in accordance with the embodiments includes measuring for a reference subarray that includes a dipole component but not a beamformer component reference subarray port parameter signals for the reference subarray. This particular method also includes measuring for each of a plurality of operational phased array radar antenna subarrays that each includes the dipole component and the beamformer component a corresponding plurality of operational subarray port parameter signals for the plurality of operational phased array radar antenna subarrays. This particular method also includes calculating for the plurality of operational phased array radar antenna subarrays a corresponding plurality of calculated beamformer parameter values from the reference subarray port parameter signals and the plurality of operational phased array radar antenna subarray port parameter signals. This particular method also includes using the plurality of calculated beamformer parameter values for the plurality of operational phased array radar antenna subarrays in a computational electromagnetic analysis computer code to determine modeled radar apparatus performance characteristics for the phased array radar apparatus assembled from the plurality of operational phased array radar antenna subarrays.

A test apparatus in accordance with the embodiments includes an enclosure that includes an array of test ports that mate with a plurality of signal ports of a phased array radar antenna subarray. The test apparatus also includes a means for energizing one of the array of test ports with an external signal while measuring a response to the external signal at the remainder of the test ports.

A test system in accordance with the embodiments includes a test apparatus comprising: (1) an enclosure that includes array of test ports that mate with a plurality of signal ports of a phased array radar antenna subarray; and (2) means for energizing one of the array of test ports with an external signal while measuring a response to the external signal at the remainder of the test ports. The test system also includes a computer programmed to calculate beamformer scattering parameters from the external signal and the response to the external signal.

BRIEF DESCRIPTION OF THE DRAWINGS

The embodiments, which include in-part: (1) a method for determining values for performance parameters for a plurality of operational phased array radar antenna subarrays; and (2) a method for calibrating a phased array radar apparatus assembled from the plurality of operational phased array radar antenna subarrays, values of whose performance parameters are determined, are understood within the context of the Detailed Description of the Embodiments, as set forth below. The Detailed Description of the Embodiments is understood within the context of the accompanying drawings, which form a material part of this disclosure, wherein:

FIG. 1, FIG. 2, FIG. 3 and FIGS. 4A and 4B shows a series of schematic diagrams of a column array radar apparatus within the context of which may be practiced the embodiments of the invention.

DETAILED DESCRIPTION OF THE EMBODIMENTS

Figure 1:
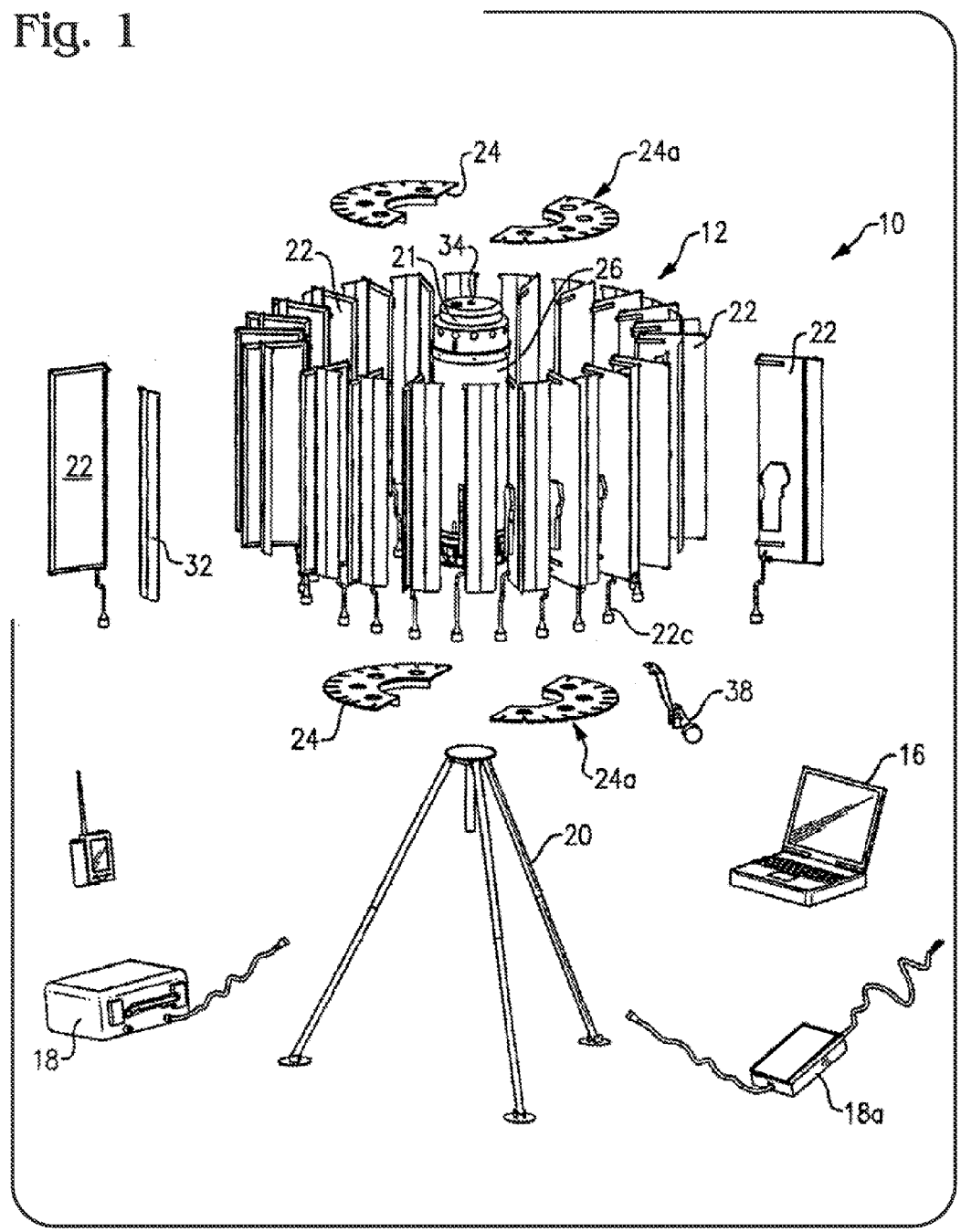

The embodiments, which include in-part: (1) a method for determining values for performance parameters for a plurality of operational phased array radar antenna subarrays; as well as (2) a method for calibrating a column array radar apparatus that may use the plurality of operational phased array radar antenna subarrays, are understood within the context of an illustrative non-limiting embodiment, a description of which is set forth below. The description set forth below is understood within the context of the drawings described above. Since the drawings are intended for illustrative purposes, the drawings are not necessarily drawn to scale.

Within the context of this illustrative non-limiting embodiment described in greater detail below, the embodiments and the invention derive from a particular observation with respect to performance and calibration of a phased array radar apparatus (i.e., which will be described within the context of a specific illustrative non-limiting "column array radar apparatus") that includes a plurality of operational phased array radar antenna subarrays (which will be described within the context of specific illustrative non-limiting "operational phased array radar antenna panel columns"), each of which includes a dipole component and a beamformer component. The observation considers that radiation pattern variations in performance of the column array radar apparatus that results from assembly of the plurality of operational phased array radar antenna panel columns may under certain circumstances derive from variation of the complex circuitry of the plurality of beamformer components included within the individual operational phased array radar antenna panel columns, and not the plurality of dipole components (i.e., the radiating element components) included within the individual operational phased array radar antenna panel columns, or the immediate geometry of assembly of the plurality of operational phased array radar antenna panel columns assembled to provide the column array radar apparatus.

Thus, the embodiments and the invention contemplate that a knowledge of the influence or interaction of the complex circuitry of the beamformer components of a plurality of operational phased array radar antenna panel columns within a column array radar apparatus is desirable to accurately model the overall performance of the column array radar apparatus and thus properly calibrate the column array radar apparatus.

To that end, the embodiments contemplate in a first instance a method for determining values for performance parameters, such as in particular beamformer scattering parameters, for each of a plurality of operational phased array radar antenna panel columns within a column array radar apparatus prior to assembling the plurality of operational phased array radar antenna panel columns into the column array radar apparatus.

For reference purposes, FIG. 1 to FIGS. 4A and 4B show a series of schematic diagrams illustrating an exemplary non-limiting column array radar apparatus within the context of which may be practiced the embodiments.

FIG. 1 shows generally a column array radar apparatus 10. The column array radar apparatus 10 more particularly comprises an antenna 12 that may be located upon and assembled to a tripod 20. The column array radar apparatus 10 further includes a laptop computer 16, and a power supply 18, among several other components.

More particularly, FIG. 1 illustrates the antenna 12 within the column array radar apparatus 10 as including a plurality of operational phased array radar antenna panel columns 22.

Figure 2:
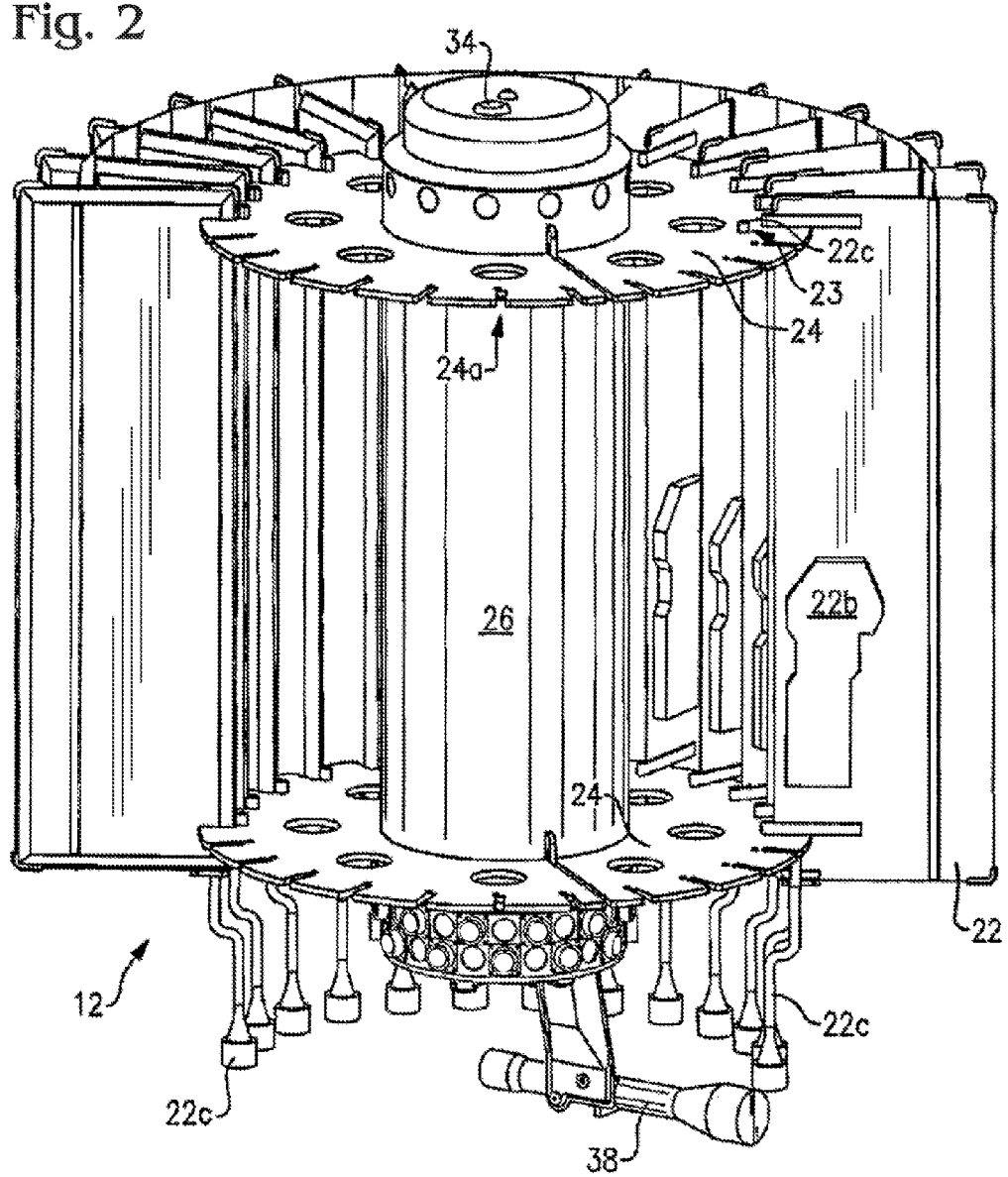

FIG. 2 further more particularly shows the antenna 12 of the column array radar apparatus 10 of FIG. 1 in greater detail. The antenna 12 comprises an L-band, 24-column cylindrical phased array column array radar antenna, preferably mounted on the lightweight tripod 20 such as is illustrated in FIG. 1. The antenna 12 scans electronically in azimuth using an electronic matrix switch and has a pair of fixed elevation beams. Both azimuth and elevation monopulse angle measurement are used to provide accurate three-dimensional target coordinates (range, azimuth, and elevation) while using the column array radar apparatus 10 that is illustrated in FIG. 1, and that includes the antenna 12.

Figure 3:
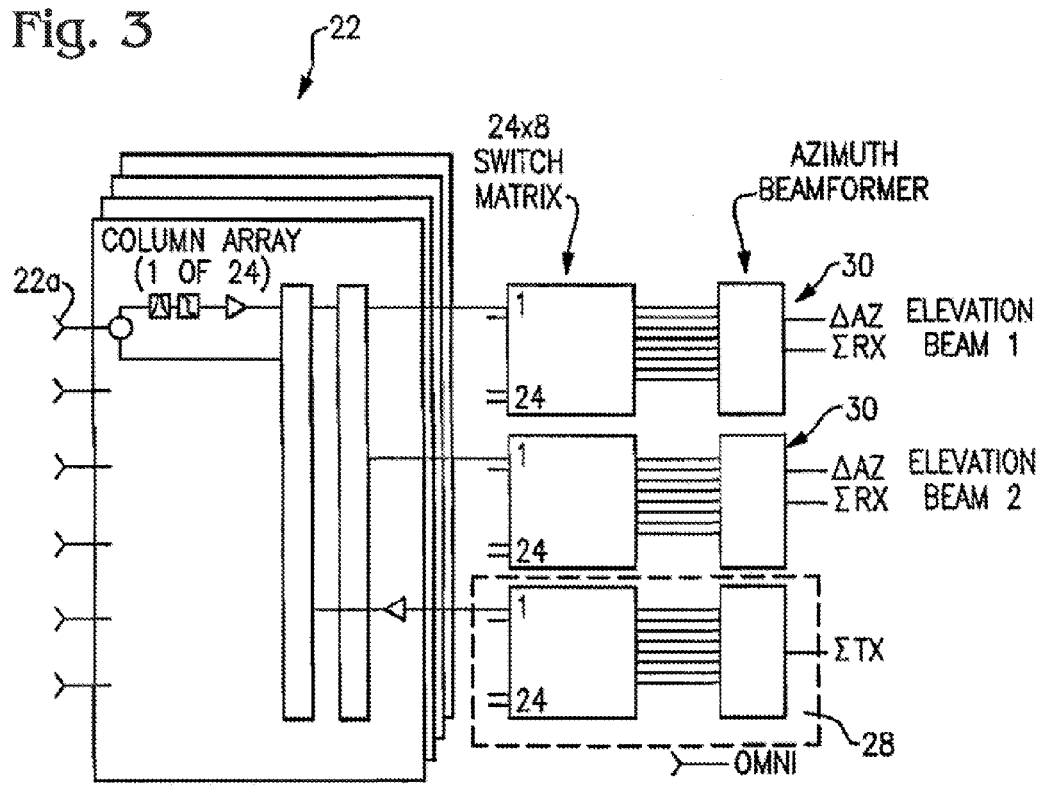

As is shown in greater detail in FIG. 2, the antenna 12 is constructed of 24 radially extending operational phased array radar antenna panel columns 22, spaced at fifteen degrees and mounted by support rings 24 to a central antenna cylinder 26 that may under certain circumstances house a transmit matrix assembly 28 and receive matrix switch assembly 30 of which there are two, as illustrated in FIG. 3. Operational phased array radar antenna panel columns 22 can be removed and stacked for transport, and can be quickly reassembled when the column array radar apparatus 10 is deployed.

As is shown in FIGS. 3, 4A and 4B, each operational phased array radar antenna panel column 22 includes an etched substrate containing six vertically polarized dipole elements 22a, each with a pre-selector filter, limiter, and low noise amplifier. The six vertically polarized dipole elements 22a are combined on an operational phased array radar antenna panel column 22 to form two stacked elevation beams that are offset in elevation angle by 17 degrees. A single elevation beam is generated on transmit, centered on the lower receive elevation beam. The elevation beams are independently tapered in amplitude and phase to reduce the below the horizon elevation angle sidelobes to suppress the effects of ground-bounce multipath. Each operational phased array radar antenna panel column 22 also contains a pair of solid-state power amplifiers 22b that generate 30 watts of peak RF power at up to a 10% duty cycle. Each power amplifier 22b drives three vertically polarized dipole elements 22a through an unequal split, three-way power divider. Operational phased array radar antenna panel column 22 further comprises cable connectors 22c for electrical interconnection to radar electronics housed in central antenna cylinder 26 and longitudinal slots 22d formed parallel and adjacent to their respective inner edges. In addition, each operational phased array radar antenna panel 22 includes a plurality of placement pins 22e that engage an opening 23 formed through support rings 24 in axial alignment with the slots 24a to further ensure accurate alignment of the operational phased array radar antenna panel columns 22 relative to cylinder 26, as is illustrated in FIG. 2.

Each of the elevation receive beam RF signals and the transmitter RF signal from each operational phased array radar antenna panel column 22 is fed into a 24 to 8 electronic matrix that instantaneously selects an 8 column sector and reorders the columns appropriately for the azimuth beamformers. For each azimuth dwell period only 8 of the 24 columns are active. On reception, the azimuth beamformers form an azimuth sum beam and an azimuth difference beam with independent amplitude tapering for optimal sidelobe suppression. The transmit beam is untapered in azimuth.

Figure 5:
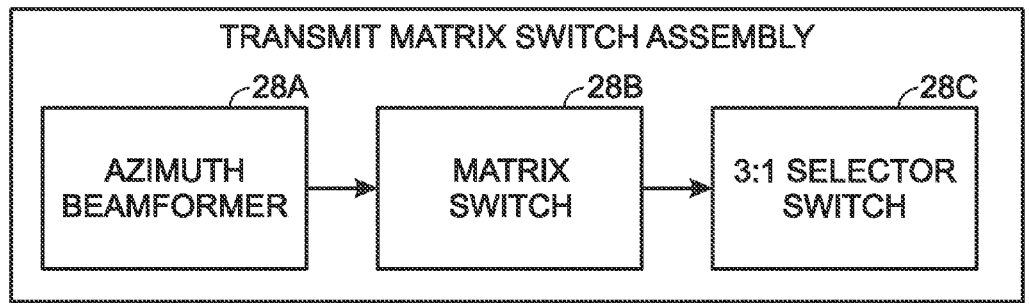
FIG. 5 and FIG. 6 show a transmit matrix assembly switch and a receive matrix assembly switch for a column array radar apparatus in accordance with the schematic diagrams of FIG. 1 to FIG. 4.

FIG. 5 shows a transmit matrix switch assembly 28 that includes an azimuth beamformer 28a that creates the eight equally weighted transmit signals that form the transmit beam. A matrix switch 28b provides beam steering by routing the eight transmit signals to the appropriate eight antenna columns 22 through a 3:1 selector switch 28c.

Figure 6:
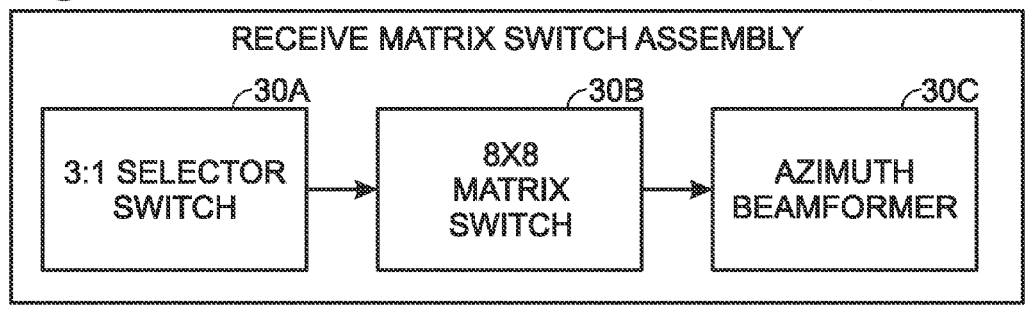

FIG. 6 shows a receive matrix switch assembly 30 that works in reverse of the transmit matrix switch assembly 28 and routes received signals from each of the eight active antenna columns 22 through 3:1 selector switch 30a and an 8.times.8 matrix switch 30b to an azimuth beamformer 30c. Azimuth beamformer 30c forms sum and difference beams on receipt of signals.

Figure 7:
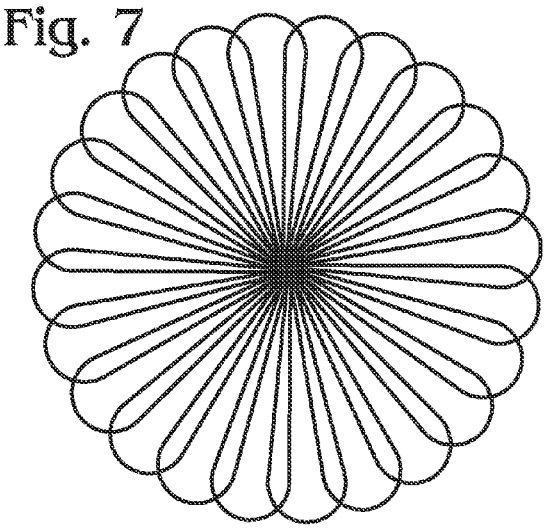
FIG. 7, FIG. 8 and FIG. 9 show ideal electromagnetic performance characteristics of a column array radar apparatus in accordance with FIG. 1 to FIG. 4B.

FIG. 7 shows a schematic diagram of 24 azimuth beams within the context of ideal operation of the column array radar apparatus 10 whose schematic diagram is illustrated in FIG. 1 to FIG. 4. The 24 azimuth beams extend radially outward from the central antenna cylinder 26. As shown in FIG. 7, the panel column radar apparatus 10 has 24 azimuth beam positions from which the azimuth beams are transmitted. These positions, as well as the proximal ends of the azimuth beams, are spaced apart at equidistant intervals in circumferential relation to the central antenna cylinder 26. These equidistant intervals are equal to 15 degrees, which yields 360 degrees of coverage by the azimuth beams. The azimuth 3-db beamwidth is slightly wider at 18.7 degrees, which accounts for the overlap of the individual azimuth beams with other azimuth beams as shown in FIG. 7.

Figure 8:
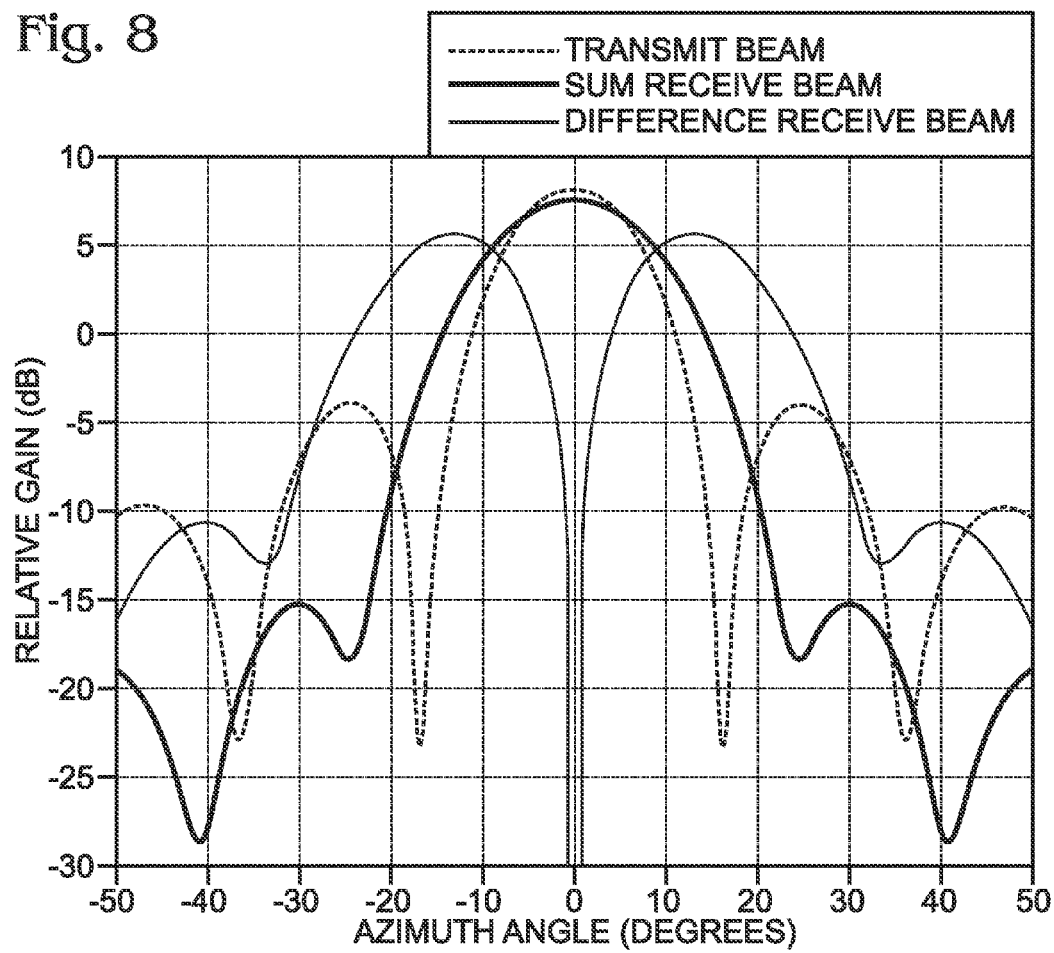

FIG. 8 depicts the transmit, sum receive, and difference beam patterns in azimuth.

Figure 9:
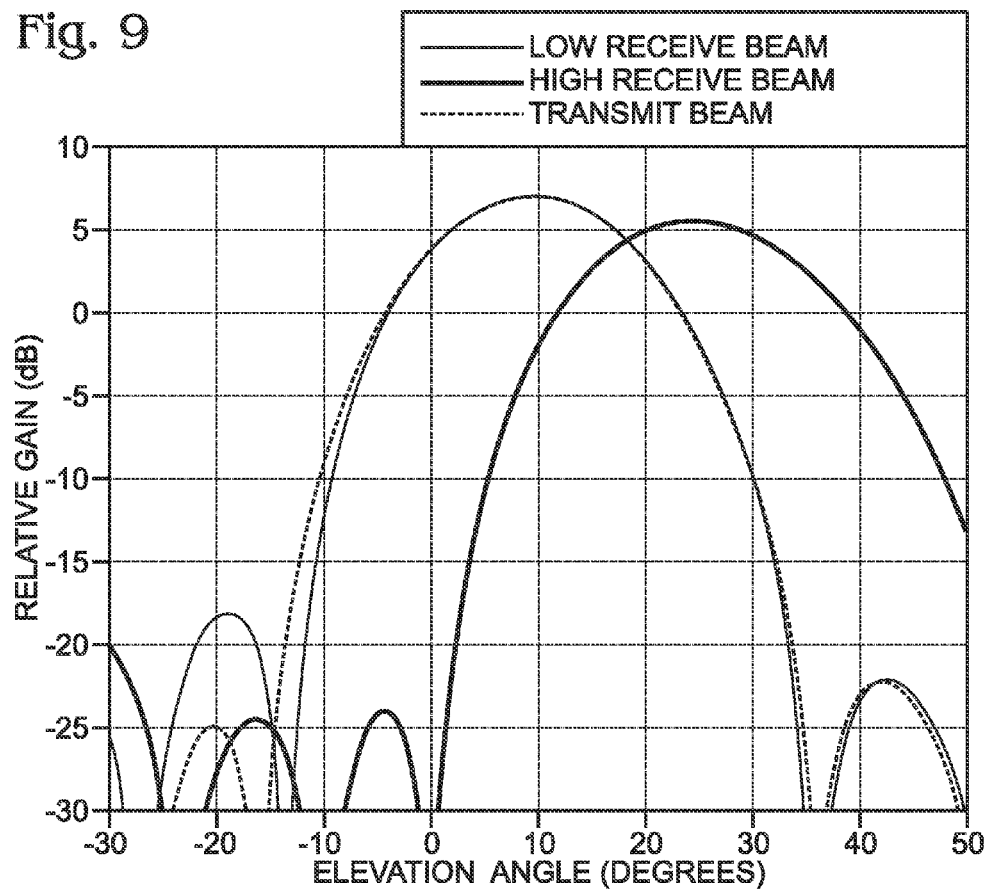

FIG. 9 illustrates the three elevation beam patterns of antenna 12, i.e., the transmit beam, lower receive beam, and upper receive beam.

While FIG. 7 in particular illustrates an ideal radar emitter source pattern for the column array radar apparatus 10 whose schematic diagram is illustrated in FIG. 1, in practice such an ideal radar emitter source pattern is not realized, and for that reason some type of calibration with respect to non-ideal radar emitter source patterns for the column array radar apparatus 10 of FIG. 1 is desirable.

To that end, the embodiments contemplate and are predicated upon the observation that in certain types of panel array radar apparatus constructions a non-ideal radar emitter source pattern may be most significantly influenced by complex electronics associated with a beamformer component that is included on an operational phased array radar antenna panel column along with a dipole component (e.g., six dipole components as illustrated in FIG. 3). The embodiments provide for an efficient "bench-top" means of measuring the characteristics (in particular, scattering parameters) of the beamformer component without having to break the connections to the dipole component.

Figure 10:
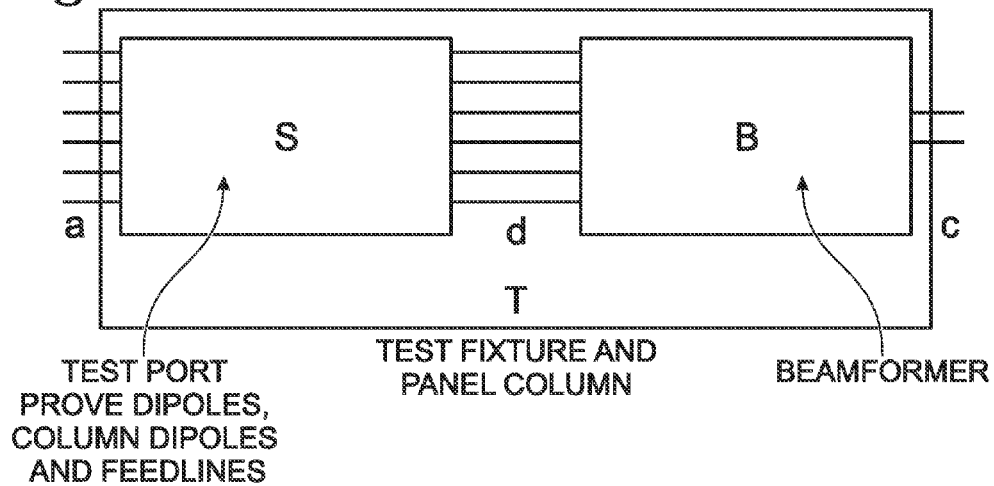
FIG. 10 shows a schematic diagram of a radar panel column including a dipole component and a beamformer component within a test apparatus illustrating measurement locations in accordance with the embodiments.

To that end, FIG. 10 shows a schematic diagram of an operational phased array radar antenna panel column 22 that is located and assembled into such a bench-top test apparatus. Within FIG. 10: (1) T is intended as the bench-top test apparatus (i.e., test fixture) and the operational phased array radar panel column (or reference array) under test; (2) S is intended as an aggregate of (test apparatus based) test port probe dipoles, and either the reference array dipoles or the dipoles (including feedlines) component of an operational phased array radar panel column; and (3) B is the beamformer component. The schematic diagram of FIG. 10 also illustrates: (1) six test ports a (i.e., signal measurement ports) at one side of the test port probe dipole and column dipole component S; (2) six ports d (or connections) located interposed between the test port probe dipole and column dipole component S and the beamformer component B; and (3) two ports c located associated with an opposite side of the beamformer component B.

In a first instance, the embodiments provide for calculation of a value for the beamformer component B scattering parameters with respect to the feedlines of the column dipole component of S at the location of the ports d. Particular equations that govern determination of the value of the foregoing scattering parameter are shown as equation (1), equation (2) and equation (3), as follows:

$$B_{cd} = T_{ca}(T_{aa} - S_{aa} + S_{ad}S^{-1}_{dd}S_{da})^{-1} S_{ad} S^{-1}_{dd} \quad (1)$$

$$B_{dd} = [S_{da}(T_{aa} - S_{aa})^{-1} S_{ad} + S_{dd}]^{-1} \quad (2)$$

$$B_{dd} = [S_{ad} + (T_{aa} - S_{aa}) S^{-1}_{da} S_{dd}]^{-1} (T_{aa} - S_{aa}) S^{-1}_{da} \quad (3)$$

Within the foregoing equations:

$B_{cd}$ and $T_{ca}$ are row matrices of respective scattering parameters between one of the "c" ports and the respective "d" or "a" ports;

$T_{aa}$, $S_{aa}$, $S_{ad}$, $S_{dd}$, $S_{da}$, $B_{dd}$, are square matrices of respective scattering parameters; and subscripts xy, where x and y are independently a, c and d, are reflected signal at the x port(s) with respect to incident signal at the y port(s).

The foregoing equations provide a basis for determination of the value of beamformer scattering parameters (i.e., $B_{cd}$ and $B_{dd}$) by making appropriate measurements of reflected signals and incident signals at the appropriate a, d and c port locations for each individual operational phased array radar antenna panel column in a plurality of operational phased array radar antenna panel columns that are assembled to fabricate a column array radar apparatus. Equation (3) is preferred over (2) because (3) avoids the inversion of $T_{aa} - S_{aa}$. Under well matched conditions, $T_{aa} \cong S_{aa}$.

FIGS. 11A through 11D shows a series of schematic diagrams that illustrate a series of process steps in accordance with the embodiments.

Figure 11A:
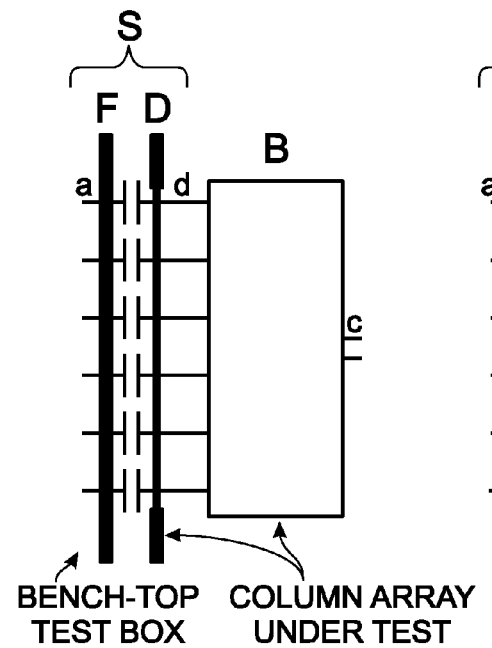
FIGS. 11A through 11D shows a schematic diagram illustrating a progressive series of process steps in accordance with the embodiments.

In general, FIG. 11A illustrates a test fixture F that is intended as the bench-top test apparatus. The test fixture F is comprised of cabling and a physical enclosure including test ports on the outside of the bench-top apparatus that are connected to test port probe dipoles on the inside of the test fixture. As is illustrated in FIG. 11A, the test port probe dipoles on the inside of the test apparatus F are intended to mate with individual dipoles within a dipole component D within a operational phased array radar antenna panel column under test. As is further illustrated within FIG. 11A, the operational phased array radar antenna panel column under test also includes the beamformer component B to which there is connected the two c ports as illustrated in FIG. 10.

The test fixture F walls are conductive to minimize radiative interference and the interior of the test fixture F walls are lined with absorber to suppress interior resonances that could exacerbate measurement errors.

More particularly within the embodiments as is illustrated in FIG. 11A, electromagnetic measurements are intended to include an appropriate electromagnetic activation at any one of the six dipole ports a (i.e., at the outside of the test fixture F) and one of the two beamformer ports c (depending on which beam is being calibrated), with measurements at the remaining six electromagnetically unactivated ports. Such measurements will also include angular components of activation (i.e., phase).

Figure 11B:
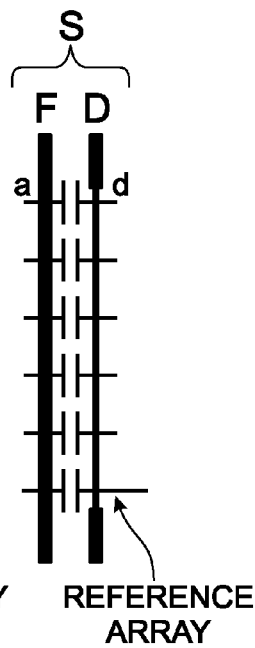

Within FIG. 11B, the same test fixture probes and test fixture F apparatus is used to determine the values of reference electromagnetic parameters for a reference antenna panel column that includes a dipole component D but not a beamformer component B. The same type of electromagnetic measurements are obtained in FIG. 11B as in FIG. 11A, with in general the difference of absence of a beamformer component B within the reference panel column. The absence of the beamformer component B also provides for measurement or excitation at one of the six ports d rather than at one of the two ports c.

Figure 11C:
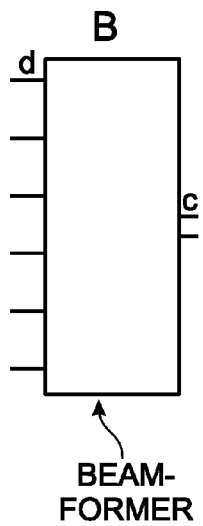

Within FIG. 11C, the electromagnetic measurements from the configuration of FIG. 11A (for each of a plurality of operational phased array radar panel columns 22) and the reference electromagnetic measurements from the configuration of FIG. 11B (which may be undertaken only once for a single reference array) are used to calculate the values of the beamformer component B scattering parameters pertaining to a plurality of operational phased array radar antenna panel columns 22. Such calculations are undertaken within the context of equations (1) to (3) above where particular definitions are provided within the context of FIG. 10.

Figure 11D:
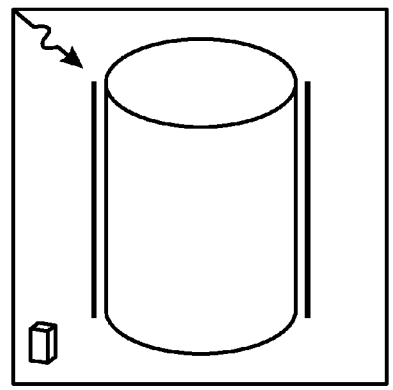

As is illustrated in FIG. 11D the beamformer scattering parameters are introduced into an otherwise generic computational electromagnetic analysis computer code model of the column array radar apparatus assembled from the operational phased array radar antenna panel column 22 so as to provide a column array radar apparatus modeled performance which serves as a basis for calibration of the column array radar apparatus. In this model, the dipole elements of all but the operational phased array radar panel column under test are terminated in the feedline impedance (typically 50, 75, or 100 Ohms).

Figure 12:
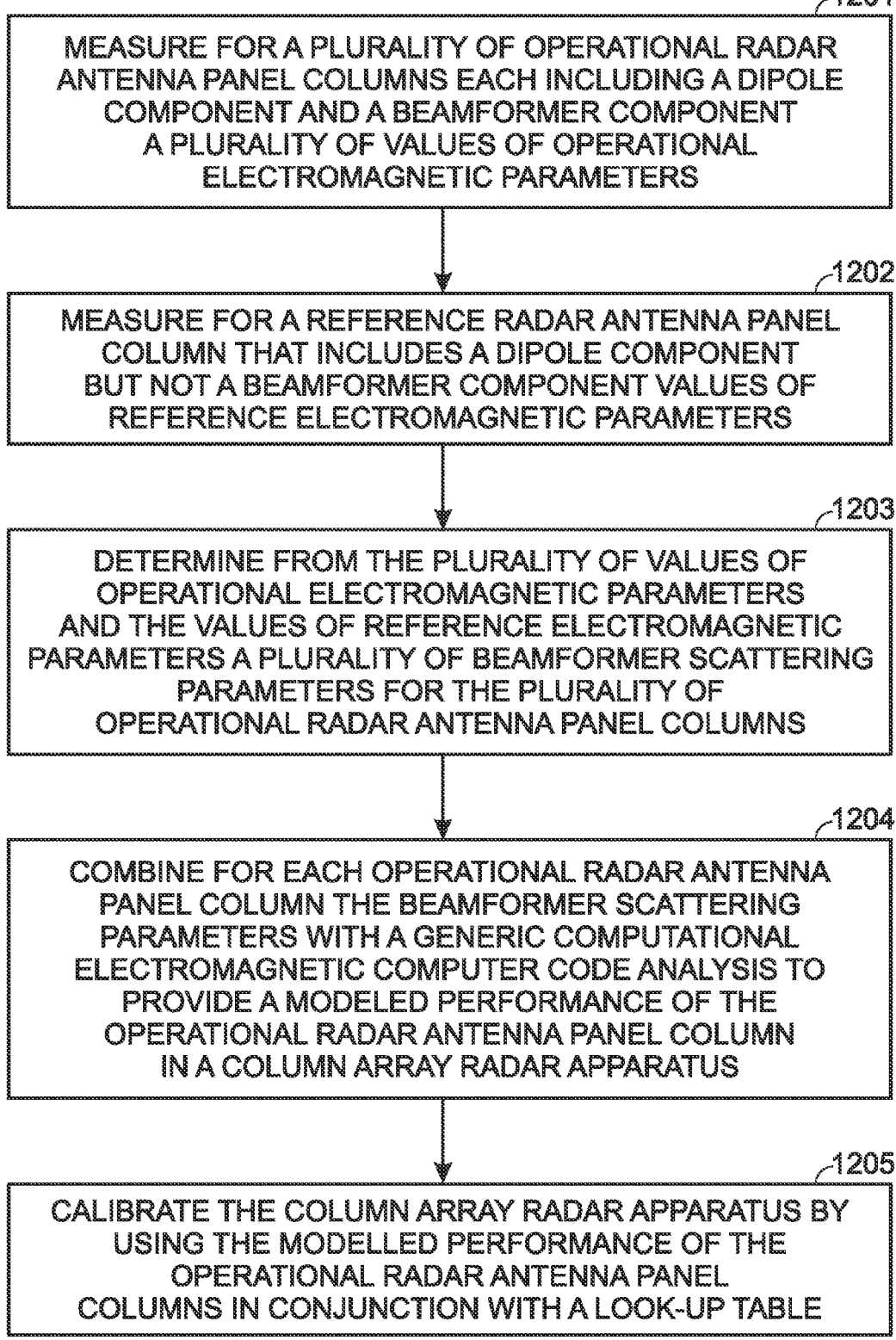
FIG. 12 shows a block diagram describing in greater detail the progressive series of process steps in accordance with the embodiments as illustrated in the schematic diagram of FIG. 11.

FIG. 12 shows a schematic block diagram illustrating in greater detail the process steps of FIG. 11A to FIG. 11D.

FIG. 12 at reference numeral 1201 first provides for measuring for a plurality of operational radar antenna panel columns each including a dipole component and a beamformer component a plurality of values of operational electromagnetic parameters.

FIG. 12 at reference numeral 1202 next provides for measuring for a reference radar antenna panel column that includes a dipole component but not a beamformer component values of reference electromagnetic parameters.

FIG. 12 at reference numeral 1203 provides for determining from the plurality of values of operational electromagnetic parameters and the values of reference electromagnetic parameters a plurality of beamformer scattering parameters for each of the operational phased array radar antenna panel columns under test.

FIG. 12 at reference numeral 1204 provides for combining, for each operational radar antenna panel column, the beamformer scattering parameters with a generic computational electromagnetic analysis computer code to provide a modeled performance of the operational radar antenna panel column in its array environment (i.e., in a column array radar apparatus).

FIG. 12 at reference numeral 1205 provides for calibrating the column array radar apparatus by using the modeled performance of the plurality of operational phased array radar antenna panel columns in conjunction with a look-up table.

Within the foregoing description, a particular generic computational electromagnetic analysis computer code program for a column array radar apparatus that allows for adjustment of modeled performance of an operational radar antenna panel column predicated upon introduction of beamformer scattering parameter values is the WIPL-D Pro computational electromagnetic (CEM) analysis computer program that is commercially available from the WIPL-D organization at sales@wipl-d.com. Other commercially available CEM computer programs are available that are expected as operative alternative computational electromagnetic programs. The embodiments also contemplate a computer assisted system that employs an otherwise generally conventional computer for data acquisition, manipulation and calculation within the context of the foregoing analysis.

Thus, the embodiments provide a method for determining values of performance parameters of an operational phased array radar antenna panel column absent disruption of any portion of the operational phased array radar antenna panel column. Similarly, the embodiments also provide a method for calibrating a column array radar apparatus that uses a plurality of such operational phased array radar antenna panel columns, that is not predicated upon field calibration (or other time or labor intensive calibration) of such a column array radar apparatus.

EXPERIMENTAL

In order to illustrate value of the embodiments and the invention, amplitude and phase measurements were obtained: (1) directly for a modified panel column comprised of two channels; and (2) indirectly using the electromagnetic modeling and operational phased array radar antenna panel column measurement methodology in accordance with the embodiments. The "beamformer" part of the modified column was constructed from an Anaren, Inc. 90 degree hybrid power divider with a simple "T" junction connected to one output to purposely introduce impedance mismatch. The third port of the "T" was terminated in 50 Ohms (and not the matching 100 Ohms). The dipole array part was composed of two dipole elements with connectors that mated with the "beamformer." The dipole array served also as a perfect reference array because it could be disconnected from the beamformer. This array was labeled $R_a$. Another reference array was built for testing, as well, and this array was labeled $R_b$.

Comparisons were obtained under three conditions which included: (1) a restricted set of equations for modeling a column array radar apparatus in accordance with the embodiments (i.e., impedance matched conditions were assumed, and in particular, that Taa=Saa=0) where equations (1) and (3) (general set) reduced to:

$$B_{cd} = T_{ca} S_{da}^{-1} \quad (4)$$

$$B_{dd} = 0 \quad (5)$$

(i.e., this restricted set was attractive because it required far fewer measurements than the general set); (2) the general set of equations for modeling a column array radar apparatus in accordance with the embodiments; and (3) modification of an operational phased array radar antenna panel column to reference port array separation from probe dipoles within the test fixture (i.e., separation distance increased from near proximity (6.17 mm) to 44.45 mm (~0.19 wavelengths at operating frequency 1,300 MHz)). Results for determination of amplitudes (in dB) and phase changes (in degrees) are illustrated in the Table that follows.

Within the Table, either Reference Array $R_a$ or $R_b$ was used as indicated. The column labeled "Control" contains the $B_{cd}$ measurements made directly with the "beamformer." That labeled "Invent" contains those measurements made indirectly using one of the reference arrays and either the restricted equations ((4), (5)) or the general equations ((1)-(3)). All amplitudes are in dB, all phases in degrees.

TABLE I

| | Control Array Amp/Phase | Invent Amp/Phase | Diff Amp/Phase | Ref Array |
|---|---|---|---|---|
| | | Restricted Equation Set | | |
| 1 | −16.2/74.5 | −13.9/104.5 | 2.3/30.0 | $R_a$ |
| 2 | −4.0/−93.9 | −4.5/−86.9 | 0.5/7.0 | $R_a$ |
| | | General Equation Set | | |
| 1 | −16.2/74.5 | −16.3/74.8 | 0.1/0.3 | $R_a$ |
| 2 | −4.0/−93.9 | −4.0/−92.8 | 0.0/1.1 | $R_a$ |
| 1 | −16.2/74.5 | −16.1/66.9 | 0.1/7.6 | $R_b$ |
| 2 | −4.0/−93.9 | −3.3/−96.1 | 0.7/2.2 | $R_b$ |
| | | Modified Test Apparatus | | |
| 1 | −16.3/74.4 | −16.2/75.0 | 0.1/0.6 | $R_a$ |
| 2 | −4.0/−93.7 | −4.0/−93.7 | 0.0/0.7 | $R_a$ |

Results in general show an increased level of correlation between: (1) the control direct measurements; and (2) the inventive modeling plus indirect measurements, under circumstances where an adequate and general set of equations is applied. In addition, the experimental data indicates that modifications to experimental parameters, such as probe to operational phased array radar antenna panel column spacing, may under reasonable experimental variations not unduly influence the favorable correlation that the inventive methodology exhibits with direct measurements.

The foregoing embodiments and experimental measurements are illustrative of the invention rather than limiting of the invention. Revisions and modifications may be made to methods, materials, structures and dimensions of components within the context of the various embodiments of the invention, while providing additional embodiments of the invention, in accordance with the following claims.

What is claimed is:

1. A method for determining scattering parameters for an operational phased array radar antenna subarray, the method comprising the steps of:
   measuring, using a reference subarray that includes a dipole component but not a beamformer component, values for a plurality of reference electromagnetic parameters;
   measuring, using an operational phased array radar antenna subarray that includes the dipole component and the beamformer component, values for a plurality of operational electromagnetic parameters; and
   calculating from the values for the plurality of operational electromagnetic parameters and the values for the plurality of reference electromagnetic parameters beamformer scattering parameters for the operational phased array radar antenna subarray.

2. The method of claim 1 wherein the plurality of reference electromagnetic parameters includes reference port parameter signals.

3. The method of claim 1 wherein the plurality of operational electromagnetic parameters includes operational port parameter signals.

4. The method of claim 1 wherein the measuring the values for the plurality of reference electromagnetic parameters and the measuring the values for the plurality of operational electromagnetic parameters is undertaken in an electrical test apparatus that electromagnetically energizes one test port and measures a signal at the remaining test ports.

5. The method of claim 1 wherein the calculating uses the equation:

$$B_{cd} = T_{ca}(T_{aa} - S_{aa} + S_{ad}S^{-1}_{dd}S_{da})^{-1}S_{ad}S^{-1}_{dd}$$

where:
B, S and T denote scattering parameter row ($B_{cd}$, $T_{ca}$) and square ($S_{aa}$, $T_{aa}$, $S_{ad}$, $S_{dd}$, $S_{da}$) matrices with identical normalizing impedances; and
subscripts xy, where x and y are independently a, c and d, are reflected signal at the x port with respect to incident signal at the y port.

6. The method of claim 1 wherein the calculating uses the equation:

$$B_{dd} = [S_{da}(T_{aa} - S_{aa})^{-1}S_{ad} + S_{dd}]^1$$

where:
B, S and T denote scattering parameter square matrices with identical normalizing impedances; and
subscripts xy, where x and y are independently a, c and d, are reflected signal at the x port with respect to incident signal at the y port.

7. The method of claim 1 wherein the calculating uses the equation:

$$B_{dd} = [S_{ad} + (T_{aa} - S_{aa})S^{-1}_{da}S_{dd}]^{-1}(T_{aa} - S_{aa})S^{-1}_{da}$$

where:
B, S and T denote scattering parameter square matrices with identical normalizing impedances; and
subscripts xy, where x and y are independently a, c and d, are reflected signal at the x port with respect to incident signal at the y port.

8. A method for calibrating a phased array radar, the method comprising the steps:
measuring, using a reference subarray that includes a dipole component but not a beamformer component reference array port, parameter signals for the reference subarray;
measuring, for each of a plurality of operational phased array radar antenna subarrays each of which include the dipole component and the beamformer component, a corresponding plurality of operational array port parameter signals for the plurality of operational phased array radar antenna subarrays;
calculating for the plurality of operational phased array radar antenna subarrays a corresponding plurality of calculated beamformer parameters from the reference array port parameter signals and the plurality of operational phased array antenna subarray port parameter signals; and
using the plurality of calculated beamformer parameter values for the plurality of operational phased array radar antenna subarrays in a general electromagnetic analysis model to determine modeled radar performance characteristics for a phased array radar comprising the plurality of operational phased array radar antenna subarrays.

9. The method of claim 8 further comprising correlating the modeled radar performance characteristics with a look-up table to calibrate the phased array radar.

10. The method of claim 8 wherein the calculated beamformer parameters comprise beamformer scattering parameters for the plurality of operational phased array radar antenna subarrays.

11. The method of claim 8 wherein the general electromagnetic model uses a computational electromagnetic analysis computer code.

12. The method of claim 8 wherein the calculating uses the equation:

$$B_{cd} = T_{ca}(T_{aa} - S_{aa} + S_{ad}S^{-1}_{dd}S_{da})^{-1}S_{ad}S^{-1}_{dd}$$

where:
B, S and T denote scattering parameter row ($B_{cd}$, $T_{ca}$) and square ($S_{aa}$, $T_{aa}$, $S_{ad}$, $S_{dd}$, $S_{da}$) matrices with identical normalizing impedances; and
subscripts xy, where x and y are independently a, c and d, are reflected signal at the x port with respect to incident signal at the y port.

13. The method of claim 8 wherein the calculating uses the equation:

$$B_{dd} = [S_{da}(T_{aa} - S_{aa})^{-1}S_{ad} + S_{dd}]^{-1}$$

where:
B, S and T denote scattering parameter square matrices with identical normalizing impedances; and
subscripts xy, where x and y are independently a, c and d, are reflected signal at the x port with respect to incident signal at the y port.

14. The method of claim 8 wherein the calculating uses the equation:

$$B_{dd} = [S_{ad} + (T_{aa} - S_{aa})S^{-1}_{da}S_{dd}]^{-1}(T_{aa} - S_{aa})S^{-1}_{da}$$

where:
B, S and T denote scattering parameter square matrices with identical normalizing impedances; and
subscripts xy, where x and y are independently a, c and d, are reflected signal at the x port with respect to incident signal at the y port.

15. A test apparatus comprising:
an array of test ports that terminate with an array of test dipoles that mate with an array of dipoles on a phased array radar antenna subarray; and
means for energizing one of the test ports with an external signal while measuring a response to the external signal at the remainder of the test ports.

16. The test apparatus of claim 15 wherein the phased array radar antenna subarray is separate from a phased array radar apparatus.

17. A test system comprising:
a test apparatus comprising:
an array of test ports that terminate with an array of test dipoles that mate with an array of dipoles on a phased array radar antenna subarray; and
means for energizing one of the array of test ports with an external signal while measuring a response to the external signal at the remainder of the test ports; and
a computer programmed for calculating values for beamformer scattering parameters from the external signal and the response to the external signal.

18. The test system of claim 17 wherein the calculating uses the equation:

$$B_{cd} = T_{ca}(T_{aa} - S_{aa} + S_{ad}S^{-1}_{dd}S_{da})^{-1}S_{ad}S^{-1}_{dd}$$

where:
B, S and T denote scattering parameter row ($B_{cd}$, $T_{ca}$) and square ($S_{aa}$, $T_{aa}$, $S_{ad}$, $S_{dd}$, $S_{da}$) matrices with identical normalizing impedances; and
subscripts xy, where x and y are independently a, c and d, are reflected signal at the x port with respect to incident signal at the y port.

19. The test system of claim 17 wherein the calculating uses the equation:

$$B_{dd} = [S_{da}(T_{aa} - S_{aa})^{-1}S_{ad} + S_{dd}]^{-1}$$

where:
B, S and T denote scattering parameter square matrices with identical normalizing impedances; and
subscripts xy, where x and y are independently a, c and d, are reflected signal at the x port with respect to incident signal at the y port.

20. The test system of claim 17 wherein the calculating uses the equation:

$$B_{dd} = [S_{ad} + (T_{aa} - S_{aa})S^{-1}_{da}S_{dd}]^{-1}(T_{aa} - S_{aa})S^{-1}_{da}$$

where:
B, S and T denote scattering parameter square matrices with identical normalizing impedances; and
subscripts xy, where x and y are independently a, c and d, are reflected signal at the x port with respect to incident signal at the y port.

* * * * *